United States Patent [19]

Marinaro

[11] Patent Number: 4,948,317

[45] Date of Patent: Aug. 14, 1990

[54] METHOD AND DEVICE FOR ELECTRICAL FITTING STABILIZATION

[76] Inventor: Carl Marinaro, 219 Oakvale Blvd., Butler, Pa. 16001

[21] Appl. No.: 345,310

[22] Filed: May 1, 1989

[51] Int. Cl.⁵ .......................... F16B 43/00; H02G 3/08
[52] U.S. Cl. .................................... 411/535; 411/547; 439/539; 220/3.7
[58] Field of Search ............... 411/523, 524, 535, 536, 411/547; 439/539, 569; 220/3.3, 3.4, 3.5, 3.7, 3.8

[56] References Cited

U.S. PATENT DOCUMENTS 3,189,077  6/1965  Willis, Jr. et al. .................. 411/523
3,651,245  3/1972  Moll ..................................... 220/3.7
3,728,468  4/1973  Grauer ................................ 439/539
4,437,784  3/1984  Peterson ............................. 411/547
4,837,406  6/1989  Emmons ............................. 220/3.7

Primary Examiner—Neill R. Wilson
Attorney, Agent, or Firm—George C. Atwell

[57] ABSTRACT

For mounting a dual socket switch, or similar electrical fitting or accessory to a junction box, a method of stabilizing the mounting and a deformable shim adapted for slidable securement, one on each of two mounting screws, for pressed deformation between the fitting and the junction box to thereby rigidify the fitting in its attachment to the junction box as an incidence of the fitting's installation.

9 Claims, 2 Drawing Sheets

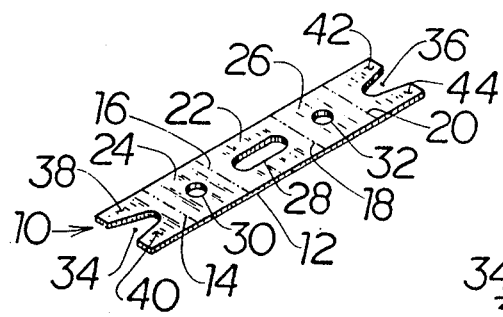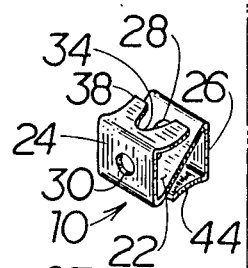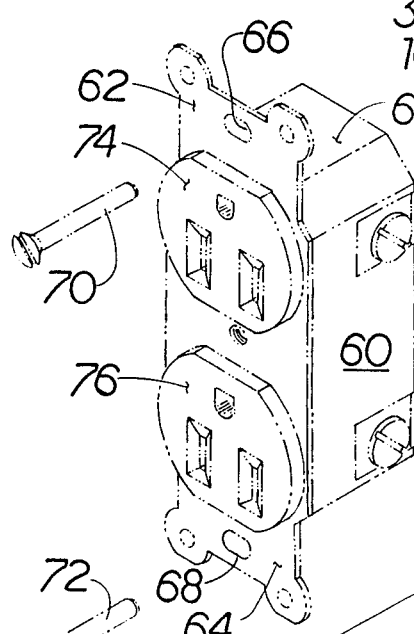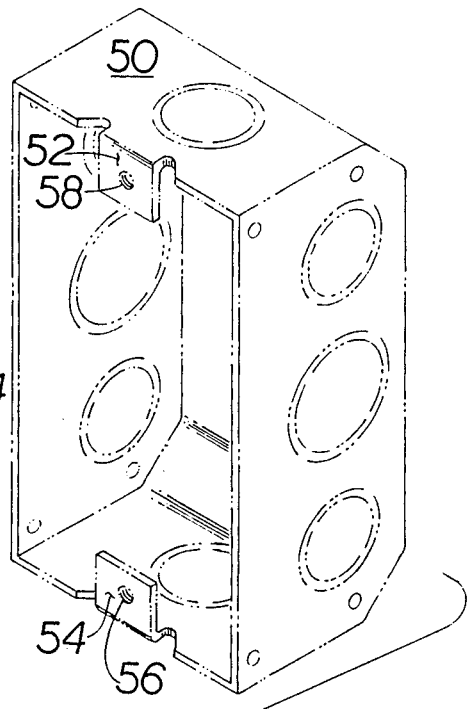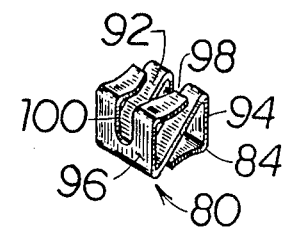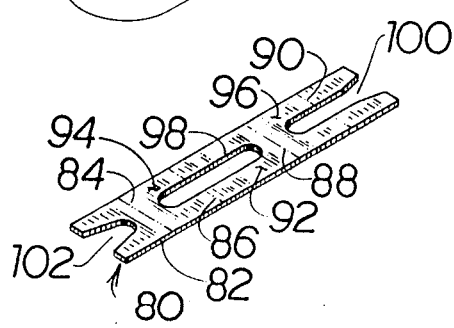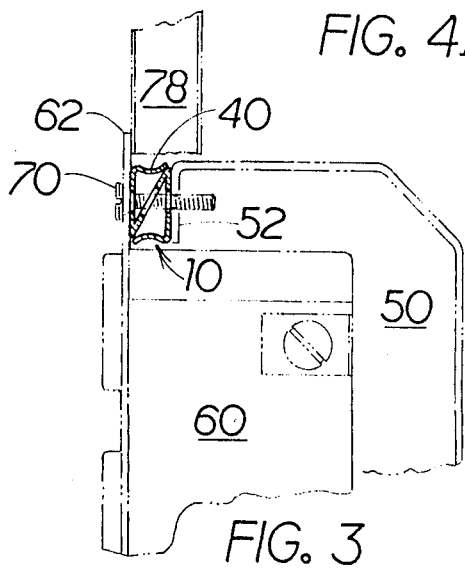

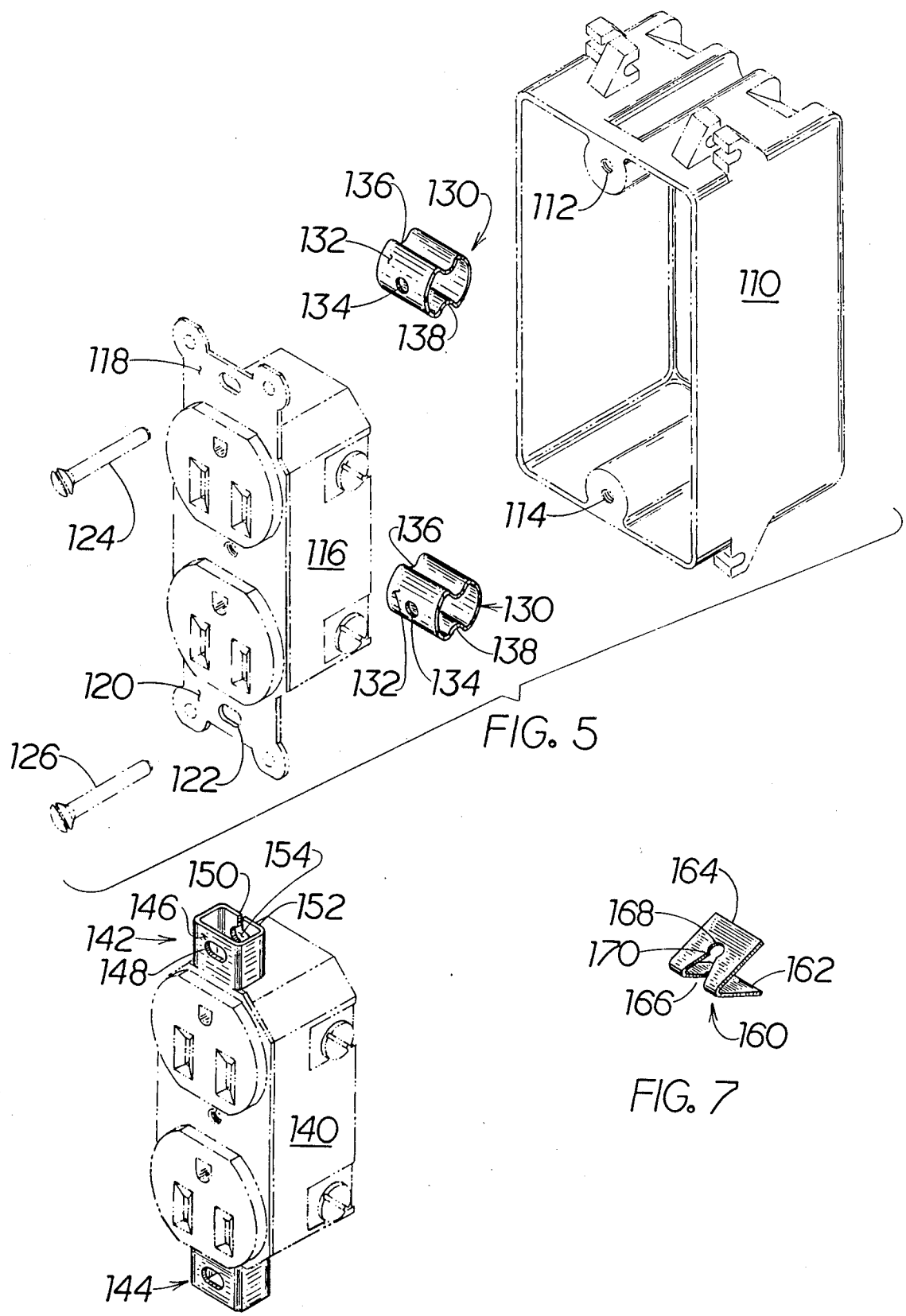

METHOD AND DEVICE FOR ELECTRICAL FITTING STABILIZATION

BACKGROUND OF THE INVENTION

This invention relates generally to fitting or accessory installation in an electrical junction box, and more particularly pertains to means for obtaining a secure stabilized placement of the fitting in the junction box.

In new building and home construction, it is common practice, once structural framing is completed, for the electrician to place electrical outlet and switch utility boxes pursuant to plan and then run electrical cables to the boxes prior to installation of lathe and plaster or plasterboard or other interior wall surface material. Ideally, when the electrician returns to complete his work by installation of the socket fittings and switches, etc, he needs only to complete the connection of the exposed cable ends, protruding from each utility box, to the fitting, then install the fitting in place within the utility box, prior to affixing the appropriate appearance cover plate. Such work can be quickly and uniformly accomplished if the forward edge of the utility box is in vertical alignment with the wall surface, however, there is often misalignment due to a twisted or bowed condition of the stud to which the utility box is mounted. Also, even when the degree of misalignment is not excessive, there is often the additional problem caused by the excessived size of the wall surface opening which surrounds the utility box. This problem is prevalent where plasterboard installer use a router to rough out an opening in a plasterboard wall surface to generally coincide with the utility box position.

In any of the situtations heretofore described, the electrician must fasten an accessory or fitting, such as a dual socket or switch, in the utility box, leaving the mounting screws in an unseated position whereby the fitting "floats" on the box. Stabilization of the fitting then may depend upon the oppositely extending metal ears of the fitting abutting against the wall surface. Where the opening about the box is too large whereby the ears will not reach the wall surface, stabilization becomes a matter of pulling the fitting into proper aligned position by means of the attachment of the appearance cover plate, and the fitting nevertheless often remains loose relative to the utility box.

Stabilization by pressure of the peripheral undersurface of the cover plate against the wall surface is often only temporary since the strain on the cover plate will often distort or fracture the plate either as an incidence of its installation or at a later time. One corrective measure has been to provide cover plates formed from high-strength and comparatively expensive plastic such as polycarbonate which is comparatively resistant to strain fracture. Limited shifting of the fitting in a vertical plane may still occur even where the integrity of the cover plate is assured by the strength of its composition. In any event, if a fitting is able to shift relative to the utility box, the electric cable or wire end connections to the fitting are flexed each time the fitting is caused to move relative to the box, thus creating a fire hazard if the wire breaks or works loose and results in current arcing. Where the fitting is a dual socket, the insertion and withdrawal of plugs moves the fitting against its wire connections, running the risk of eventual wire severance. Where the fitting is a switch assembly with a toggle or dimmer dial, an undesirable shifting of the fitting can occur each time manual force is applied to manipulate the switch.

The foregoing problems have been recognized and previously addressed by various means in the prior art. For the situation where the utility box is disposed backwardly from the wall surface and the opening in the wall surface about the utility box is excessive, an oversize appearance cover plate has been provided for use in combination with a back-up flat sheet metal shim plate. This approach creates a stabilizing tension between the fitting and the wall surface but does not entirely solve the problem of the floating fitting and its tendency to shift relative to the utility box due to the unseated mounting screws.

In addition to the commercially introduced devices which have been made available over the years to achieve stabilization of an electrical fitting with a utility box, various on-site means are often employed by innovative electricians to compensate for situations where utility boxes are mounted in misaligned orientation and to achieve firm attachment of electrical fittings to such boxes. It is not uncommon to employ multiple washers on the mounting screw between the fitting ear and the utility box or to jam pieces of cardboard or plastic onto the screw shank in order to fill the void between the fitting ear and the box and thus shim the connection. Plastic tabs have, in fact, been made commercially available for this purpose. Such tabs, whether used singly or in plural stacks, have the disadvantage of permanent deformation which generally results in later loosening of the connection.

One early attempt to solve the aforedescribed problems is found in U.S. Pat. No. 2,291,107 wherein socket supporting elements, in the form of a pair of transversely extending shim plates, are provided to be carried on the utility box mounting screw with opposite ends extending laterally to overlie the wall surface beneath the appearance cover plate. The structure of this invention depends on stabilizing the fitting to the wall surface but does not address stabilization of the fitting directly to its junction box.

SUMMARY OF THE INVENTION

This invention comprehends a means to attach an accessory or a fitting, such as a dual receptacle, switch, or the like, to an electrical junction box whereby the fitting can be properly aligned with the adjacent wall surface even though the junction box may not be properly aligned relative to the wall surface such that abutment mounting of the fitting to the junction box is inconsistent with wall surface alignment.

The structure of the invention, for practicing the method herein disclosed, may take one of several forms, comprising a deformable shim or spacer for slidable securement on the mounting screw of an electrical accessory to be attached to a utility box. In one preferred form, the structure of the invention comprises a normally substantially rigid body member having oppositely-facing first and second bearing surfaces and an intermediate integral connecting body portion extending between the bearing surfaces. The intermediate body portion is deformable in response to force applied equally against the bearing surfaces by the inward manipulation of the mounting screw as an incident of installing the accessory or fitting on the utility box. The shim may be formed from sheet metal or plastic and it is preferred that it has some degree of elasticity although its most critical characteristic is its capability of gradual compressive deformation.

It is a primary objective of the method and structure herein disclosed to provide a means of stabilizing the connection of an electrical accessory or fitting to an electrical junction box whereby the fitting or accessory will be permanently held in a fixed position relative to the utility box and in proper alignment with the adjacent wall surface, particularly in an instance where the utility box may be misaligned relative to the wall surface. The term "wall surface" is, for the purpose of this disclosure, given a board generic meaning to include a wall, floor, or ceiling surface where an opening may be provided to accommodate installation of a utility or junction box in the construction or remodeling of a building or housing structure.

Details of the method of this invention and the several embodiments of the invention structure will be best understood from the ensuing description when read with reference to the accompanying drawings.

BRIEF DESCRIPTION OF THE DRAWINGS

FIG. 1 is a perspective view of a shim device in accordance with the present invention, shown at an intermediate stage of its manufacture and prior to its final formation;

FIG. 2 is an exploded view of certain electrical components and further illustrating the shim device first shown in FIG. 1 formed for use in cooperation with the illustrated electrical components;

FIG. 3 is a elevational view in partial vertical section illustrating the shim device shown in FIGS. 1 and 2 in its intended installed position;

FIG. 4A is a perspective view illustrating a modified form of the structure first shown in FIG. 1;

FIG. 4B is a perspective view of the final form of the structure first shown in FIG. 4A;

FIG. 5 is an exploded perspective view of certain electrical components in combination with a second embodiment of a shim device in accordance with the present invention;

FIG. 6 is a perspective view of an electrical fitting wherein an embodiment of a shim device structure in accordance with the present invention is an integral part of the fitting; and FIG. 7 is a perspective view of still another embodiment of a device in accordance with the present invention.

DETAILED DESCRIPTION OF THE PREFERRED EMBODIMENTS

In FIG. 1 there in shown a shim device 10 which in the initial stage of its manufacture comprises a flat planar elongated member 12. Described transversely across the surface of the member 12 are break lines 14, 16, 18, and 20. Defined between break lines 16 and 18 is an intermediate body section 22 and it is flanked by opposite respective sections 24 and 26, which are respectively defined by break lines 14 and 16, and 18 and 20. The central section 22 defines an elongated slot 28, and the sections 24 and 26 respectively define apertures or openings 30 and 32. At the opposite ends of the member 12 are notches 34 and 36 which respectively separate legs 38 and 40, and 42 and 44.

In the last step of its manufacture, the device 10 is foldably formed, by folding it along the aforementioned break lines, to its configuration as shown in FIG. 2. Also known in FIG. 2 is an electrical utility box 50 having tabs 52 and 54 with respective threaded holes 56 and 58. FIG. 2 further illustrates an electrical fitting or receptacle 60 having mounting ears 62 and 64 with respective holes 66 and 68 for accommodating mounting screws 70 and 72.

In electrical wiring installation, the utility box 50 would be suitably mounted on a stud or similar frame member with wire ends protruding from the open face of the box (not shown) for appropriate connection to the fitting 60 after which the fitting 60 would be installed with its major body portion within the box and its face, the dual receptacle arrangement, across the face of the box. Typically, screws such as the screws 70 and 72 are inserted through the openings 66 and 68 and threadably secured in the openings 56 and 58 of the tabs 52 and 54.

In the ideal situation, box 50 would be mounted on its supporting stud whereby its forward edge would be in both vertical and horizontal alignment with the outer surface or wallboard or similar wall surface finishing material. Then, proper installation of the fitting 60 would draw the ears 62 and 64 firmly against the tabs 52 and 54. Protruding portions 74 and 76 of receptacle 60 would then be in position for installation of, and aligned registration with, a typical appearance cover plate (not shown) to complete the installation.

The aforedescribed installation, where proper alignment between the various electrical components and the wall surface is obtained, is not consistently obtained in practice, often due to a twisted or bowed stud to which the utility box is mounted or an uneven outer surface on the stud to which the wall surface conforms. In such situations, it is common, where conditions permit, to fasten the receptacle by the mounting screws to the utility box whereby the ears of the receptacle overlap and firmly abut against the adjacent outer wallboard surface, thereby attempting to stabilize the receptacle. Attachment of the appearance cover plate will tend to further stabilize the receptacle if the cover plate, when threadably attached to the receptacle, is in firm contact with the surrounding wall surface. Often, the end result of such an installation is that, although it will visually pass inspection, the receptacle is not firmly fixed and will rock or shift slightly relative to the utility box when an appliance plug is inserted into the receptacle or withdrawn from it.

Utilization of a pair of the devices 10 as shown in FIG. 2 provides a firm adjustable mounting arrangement for an electrical fitting, such as a receptacle or switch, to a junction box, with each device 10 acting a deformable shim to complete a firm attachment.

In its configuration shown in FIG. 2, the device 10 is formed in a box-like shape and provided with a central passage to enable it to be slidably placed on the fitting mounting screw, for installation between the ear of the fitting and the tab of the junction box. When the flat blank shown in FIG. 1 is folded along the indicated break lines to form the configuration of the device 10 shown in FIG. 2, holes 30 and 32 come into alignment with slot 28 to form a central passage through the device for insertion therethrough the flank of the mounting screw with the opposed outer surfaces of sections 24 and 26 serving as flat bearing surfaces against which compressive force will be applied during the installation procedure. In its formed configuration as shown in FIG. 2, the central section 22 extends diagonally between opposite edges of the two bearing surfaces. Opposite sides of the device 10 are formed by the legs 38 and 40 on one side, and 42 and 44 on the opposite side. Each pair of adjacent legs are arcuately formed to provide a concave shape, with the distal ends of the legs in contact with the surface of the section 22. Each adjacent pair of these legs constitutes a deformable flange which contributes to the elastic resistance to compression of device 10, a characteristic which in turn contributes to the stabilization of the connection of the fitting to the utility box as hereto described.

The device 10 is intentionally designed and configured whereby the dimension taken from the axis of its central screw passage and across the outer face of either of sections 24 and 26 to any of the straight bordering edges is no greater than the distance taken radially from the center of the ear mounting hole (such as 66 in FIG. 2) to the body 67 of the fitting or receptacle 60. Accordingly, the lateral expanse of the device 10 (or of any other embodiment of the invention herein described) is such that the electrician need not be concerned with any particular rotational orientation so long as the device is disposed on the mounting screw and between the ear of the receptacle and the tab of the utility box. For example, FIG. 3 shown a shim device 10 in its operative position in a typical installation with the flange formed by legs 38 and 40 oriented upwardly and the flange formed by legs 42 and 44 oriented downwardly. The shim device 10 would serve its intended purpose just as well if it happened to be installed in a rotated position on the screw 70, as shown in FIG. 3.

The primary purpose of FIG. 3 is to illustrate the manner in which the device 10 is capable of achieving firm securement of the receptacle 60 in its mounted attachment to the box 50. The box 50 is shown mounted whereby its forward peripheral edge, defining its open face through which the body of the receptacle 60 is inserted, is misaligned with the outer surface of wallboard 78. The device 10 is utilized between the ear 62 and the tab 52 as a shim or spacer capable of elastic deformation in response to rotative installatin of the screw 70. Utilization of a pair of the device 10 on the upper and lower mounting screws (only one of which is shown in FIG. 3) provides a means of quickly attaining a firm attachment between the box 50 and the receptacle 60. This firm attachment will occur even if the opening in the wallboard 78 to accommodate the installation is oversized whereby the ear 62 (and the opposite ear 64) of the receptacle 60 make no contact whatsoever with the outer surface of the wallboard.

Having described the characteristics and function of the embodiment of the invention shown in FIGS. 1-3, attention is directed to an alternative form of the invention shown in FIGS. 4A and 4B. FIG. 4A shows an alternative shim device 80 in accordance with the present invention which initially is a blank form 82 having transverse break lines 84, 86, 88, and 90. The break lines 84 and 88 define an intermediate section 92. Break lines 84 and 86 define between them a section 94, and break lines 88 and 90 define between them a section 96. Through the intermediate section 92 is an elongated slot 98. Another elongated slot 100 opens outwardly at one end of the blank 82 and a comparatively shorter slot 102 is provided at the opposite end.

FIG. 4B shows the blank 82 properly folded along the aforementioned break lines to form a configuration similar to the device 10 shown in FIG. 1 except that the slots 98 and 100 cooperate to provide a side opening to enable the device 80 to be installed to its operative position after the receptacle mounting screws, such as 70 and 72 in FIG. 1, have already been installed in position through the mounting holes 66 and 68 and into the threaded holes 51 and 58 of the box 50. Device 80, as shown in FIG. 4B, enables the electrician to complete its installation from a side or lateral position onto the shank of the mounting screw or to remove or replace it while the mounting screw is threadably engaged into its accommodating tab hole of the box 50.

FIG. 5 shows still another embodiment of structure in accordance with the present invention capable of accomplishing the same function as heretofore described with reference to devices 10 and 80. Specifically, FIG. 5 shows a utility box 110, of the molded plastic type, having threaded screw sockets 112 and 114. A receptacle 116 is illustrated as having oppositely extending ears 118 and 120. The ears have respective mounting holes 121 and 122 to accommodate mounting screws 124 and 126.

For disposition between the respective ears 118 and 120 and the utility box 110, a pair of shim devices 130 is provided. Each shim device 130 has oppositely facing bearing surfaces, although only the bearing surface 132 is visible in FIG. 5. Each of the bearing surface has a central hole, as illustrated by hole 134, which are aligned to accommodate extension therethrough of the mounting screw shank. Opposite sides 136 and 138 of the device 130 are inwardly sloped in an arcuate configuration whereby pressed deformation of the device 130 between the ear 118 and the box 110 will cause the side 136 to deform inwardly toward the screw shank as the bearing surfaces are forced toward each other.

In forming the device 130, a long length of tubular metal stock may be used having spring steel or elastic characteristics and the desired configuration may be formed in the tubular stock by extrusion. The extrusion can then be "chopped" into a plurality of the devices 130. It is recognized that a suitable shim device, capable of accomplishing the purpose of the invention, can be obtained without the provision of the inwardly curved sides 136 and 138 whereby the device would be circular in cross-section. This form, however, will result in outward deformation of the device body, as it is compressed and deformed, to a generally elliptical cross-section which ultimately can bind against the body of the receptacle. Hence, the preference for the inward provided by the inwardly curved sides 136 and 138.

It should be noted with respect to the device 130 that the dimension of the device body taken normal to the axis of the hole 134 should be limited whereby the device 130 can be utilized in a position rotated 90° from that shown in FIG. 5 without binding against the surface of the body of the receptacle, thus not requiring that the device 130 be specially oriented so long as it is properly placed in its operative disposition between the receptacle ear and the utlity box, and on the shank of the mounting screw.

If desired, the device 130 shown in FIG. 5 can be appropriately slotted from each of its mounting holes and across the bearing surfaces in the same direction to open at one end thereof whereby the device 130 would be installable from a lateral or side position onto the shank of the mounting screw, in the same manner as the installation provided for the device 80 shown in FIG. 4B.

FIG. 6 of the drawing shows a fitting in the form of a receptacle 140 having modified upper and lower ears 142 and 144 which incorporate, as an integral part of an electrical fitting, the inventive concept herein disclosed.

The ear 142 is shown as having an outwardly facing surface or central section 146 defining a mounting hole 148. The ear 142 further has rearwardly extending and inwardly turned integral extension 150 and 152 which at their terminus are slightly spaced apart to define them an open space 154. The structure and configuration of ear 144 is identical to that of ear 142. The specially formed ears 142 and 144 which are integral to the fitting 140 will accomplish the elastically deformable shimming effect heretofore described in reference, for example, to the device 10 shown in FIG. 2, except that here, in FIG. 6, the shimming device is provided as an intergal part of the fitting.

FIG. 7 illustrates a simplified embodiment of the present invention in the form of a shim clip 160 having a V-shaped body presenting spaced-apart legs 162 and 164, with a slot 166 provided centrally in the apex of the V-shaped body and merging with respective circular apertures 168 located centrally in the legs 162 and 164. The slot 166 can be best visualized as two open-bottom keyhole slots merging at the bend from which the legs project.

The device 160 can be utilized in the same manner as heretofore described with respect the the device 80 shown in FIG. 4B, since it is adapted to be used as a deformable shim between the fitting ear and the tab or socket of a utility box and can be mounted in a lateral sliding action onto the shank of a mounting screw already in position. The outer surfaces of the legs 162 and 164 serve as bearing surfaces for abutting contact, respectively, with the area of the utility box defining the mounting screw socket and the inside surface of the ear of the fitting to be mounted in the box.

The slot 168 serves as a means of sliding the clip 160 laterally onto the shank of a fittig mounting screw, in the same general manner as heretofore described with regard to device 80 shown in FIG. 4B. Each of the opposite openings, such as 168, has a diameter substantially that of the outside diameter of the shank of the typical receptacle mounting screw, and a narrow neck area 170 is sufficiently wide to enable the clip to be forceably pushed onto the screw shank but is sufficiently narrow to resist removal or dislodgement of the clip from its mounted operational position on the screw shank. In use, the legs 162 and 164 of the clip 160 are forced toward each other when the mounting screw is threadably rotated into its engagement with the utility box to draw the receptacle into position. The elastic or spring characteristic of the clip renders it resistant to the squeezing deformation.

Where, in a particular installation, the utility box is mounted rearwardly from the wall surface an unusual distance, it may be beneficial to employ a plurality of the shim clips 160 on each mounting screw. In this regard, where the angle of the leg 162 to the leg 164 is maintained at 45°, then a pair of the shim clips 160, positioned together on a mounting screw, will form a rectilinear unit in the sense that the outer leg of each clip in the pair will constitute a transversely extending bearing surface substantially as described with reference to the surfaces 24 and 26 of the device 10 shown in FIG. 2.

While various embodiments of the present invention have been heretofore described and illustrated in the accompanying drawings, it is to be understood that other embodiments or variations may be made with benefit of the teachings herein and without departing from the spirit and scope of the invention, and that all such embodiments and equivalent variations are intended to be included within the scope of the appended claims.

I claim:

1. A deformable shim for slidable securement on the shank of a mounting screw of an electrical accessory, between a mounting tab of the accessory and a utility box, including:
    a body member having oppositely-facing first and second spaced-apart bearing surfaces;
    the body member having integral deformable means interconnecting the bearing surfaces; and
    the deformable means being adapted to defrom generally inwardly toward the screw shank in response to force applied equally against the bearing surfaces by inward manipulation of the mounting screw as an incident of installing the accessory on the utility box.

2. The shim of claim 1 wherein each bearing surface defines an opening therethrough to accommodate disposition through the body member of the mounting screw.

3. The shim of claim 1 wherein the deformable means is an intermediate body portion extending generally between the bearing surfaces.

4. The shim of claim 3 wherein the intermediate body portion extends from an edge of the first bearing surface generally diagonally and through the plane of extension of the mounting screw to an edge of the second bearing surface.

5. The shim of claim 3 wherein the intermediate body portion defines an elongated slot.

6. The shim of claim 1 further comprising an integral deformable flange extending from each bearing surface and generally toward the other bearing surface.

7. The shim of claim 1 wherein the shim is elastically deformable.

8. For an assembly including an electrical receptacle mounted on a utility box wherein the receptacle is of the type having oppositely-projecting ears with respect to holes for accommodating mounting screws for fastening the receptacle to the box, a device for stabilizing the receptacle in relation to the box comprising:
    a V-shaped clip with a pair of legs adapted for placement on the screw between the ear and the box;
    means on the clip promoting its retention on one of the screws;
    the clip being resitent to deformation but deformable between the ear and the box when the ear is drawn toward the box by manipulation of the screw on which it is retained;
    a hole in each leg of substantially the same diameter as the shank of the mounting screw;
    the slot merging with the holes and gradually narrowing toward the holes;
    the point of merger with the slot of each hole being at the narrowest part of the slot; and
    the width of the narrowest part being less than the mounting screw diameter.

9. A shim for stabilizing an electrical accessory to a utility box, having spaced-apart oppositely-facing and generally parallel bearing surfaces;
    each bearing surface defining an aperture aligned one with the other to accommodate extension therethrough of a mounting screw;
    normally rigid means separating the bearing surfaces and adapted to yieldably deform inwardly toward the mounting screw when a compressive force is applied to squeeze the bearing surfaces toward each other.

* * * * *